United States Patent
Scheibl et al.

(10) Patent No.: US 6,276,066 B1
(45) Date of Patent: Aug. 21, 2001

(54) POSITIONING DEVICE

(75) Inventors: Lothar Scheibl, Aachen; Albrecht Hof, Aalen, both of (DE)

(73) Assignee: Carl-Zeiss-Stiftung (DE)

( * ) Notice: Subject to any disclaimer, the term of this patent is extended or adjusted under 35 U.S.C. 154(b) by 0 days.

(21) Appl. No.: 09/354,532

(22) Filed: Jul. 15, 1999

(30) Foreign Application Priority Data

Jul. 15, 1998 (DE) ............................................. 198 31 744

(51) Int. Cl.$^7$ ...................................................... G01B 3/00
(52) U.S. Cl. ............................................. 33/1 PT; 33/813
(58) Field of Search ................................. 33/1 PT, 706, 33/709, 813, 818, 819, 820; 310/311

(56) References Cited

U.S. PATENT DOCUMENTS

| | | | |
|---|---|---|---|
| 4,174,575 | * 11/1979 | Nakata | 33/813 |
| 4,308,666 | * 1/1982 | Hahn et al. | 33/820 |
| 4,496,865 | * 1/1985 | Allen et al. | 33/813 |
| 4,530,155 | * 7/1985 | Burkhardt et al. | 33/1 PT |
| 4,532,711 | * 8/1985 | Shirai | 33/813 |
| 4,586,260 | * 5/1986 | Baxter et al. | 33/706 |
| 4,663,851 | * 5/1987 | Feichtinger | 33/1 PT |
| 4,989,329 | * 2/1991 | Pullen | 33/1 PT |
| 5,018,397 | * 5/1991 | Matich | 33/1 PT |
| 5,299,609 | * 4/1994 | Wedler | 33/813 |
| 5,311,666 | * 5/1994 | Jacobsen et al. | 33/1 PT |
| 5,560,118 | * 10/1996 | Plummer | 33/709 |
| 5,655,311 | * 8/1997 | Affa | 33/706 |
| 5,664,336 | * 9/1997 | Zanier et al. | 33/706 |
| 6,132,099 | * 10/2000 | Olszewski et al. | 384/498 |

FOREIGN PATENT DOCUMENTS

| | | |
|---|---|---|
| 38 12 684 A1 | 4/1988 | (DE) . |
| 195 16 643 C1 | 5/1995 | (DE) . |
| 0 262 408 A2 | 8/1987 | (EP) . |
| 8313785 | 11/1996 | (JP) . |

OTHER PUBLICATIONS

Patent Abstract of Japan, Publication No. 63153405; dated Jul. 14, 1987, Inventor: Mikoshiba Nobuo.

* cited by examiner

*Primary Examiner*—Diego Gutierrez
*Assistant Examiner*—Madeline Gonzalez

(57) ABSTRACT

A positioning device is provided with a spindle and a spindle nut cooperating therewith for the conversion of a rotary motion into a linear motion for a coarse adjustment, and a piezoelectric linear positioning element arranged in series with the spindle and spindle nut for fine adjustment. The piezoelectric linear positioning element is relieved of transverse forces and moments by a cardan joint that is arranged between an object seating and the spindle.

20 Claims, 2 Drawing Sheets

POSITIONING DEVICE

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates to a positioning device with a mechanism for converting rotary motion into a linear motion, and more particularly, such a positioning device with a coarse adjustment and a fine adjustment.

2. Discussion of Relevant Art

German Patent DE 195 16 643 C1 describes a hardness testing equipment with an extending ram having a force measurement device at its tip. The ram can be moved in a two-stage manner by a combination with a spindle and a piezo positioner. The displacement movement can then be uncoupled by means of a spindle nut and a longitudinal guide integrated into the device. A movement of the piezo positioner is superposed on the movement of the spindle nut, in that the piezo positioner is coupled e.g. coaxially with the spindle nut. In this equipment, only the total stroke can be measured, and thus the reference surface is not clear. A measurement of a difference of the movement of the piezo positioner relative to the spindle nut is not provided. Since piezo elements operate with hysteresis, the deflection state of the piezo positioner therefore cannot be exactly given, particularly when a fine adjustment in the range of motion of e.g. 100μ is provided. A positioning movement takes place only in the axial direction. Since the equipment ends in a measuring tip for axial reaction forces, no transverse forces, which can arise from tilting of the sensed surface, need be taken up. Moreover, no alternating directions of motion are provided in the prior art equipment.

Japanese Laid-Open Patent Publication JP-A-8-313785 shows a microscope focusing drive with a conventional rack drive and a subsequent piezo element.

SUMMARY OF THE INVENTION

In contrast, the present invention has as its object to provide a positioning device of the kind mentioned at the beginning, which functions with high accuracy and indeed also when tilting has to be taken into account.

According to the invention, this object is achieved by a positioning device comprising: an object seating, a spindle, a spindle nut cooperating with said spindle for conversion of a rotary motion into linear motion for a coarse adjustment, a piezoelectric linear positioning element for fine adjustment arranged in series with said spindle and said spindle nut, and a joint arranged between said object seating and said spindle, which relieves said piezoelectric linear positioning element of transverse forces and moments.

By means of the joints, in particular cardan joints, the piezoelectric linear positioning element is loaded only in the axial displacement direction. This means that except for axial forces, all other forces are uncoupled from the spindle. By virtue of the invention, the load effect always takes place centrally, including, for example, when the positioning device is provided for a plate. Thus transverse forces that could damage the piezoelectric linear positioning element are prevented with certainty.

BRIEF DESCRIPTION OF THE DRAWINGS

Advantageous embodiments and developments of the invention will become apparent from preferred embodiments of the invention, which are described, with reference to the accompanying drawings, in which.

DETAILED DESCRIPTION OF PREFERRED EMBODIMENTS

The positioning device described hereinbelow makes possible, besides a positioning to within a few millimeters, a further, exact positioning in the region of several nanometers. This is attained in the form of a compact positioning unit by the combination of a spindle 1 with a piezoelectric linear positioning element, which has at least one piezo-element 2, in the form of a combined coarse positioning with the spindle 1 and a fine travel by actuation of the piezo-element 2. A high bearing load and high rigidity of the spindle 1 are obtained by the use of the piezo-element 2.

The base of the positioning device includes a seating bushing 3. A spindle nut 4 of the spindle 1 is clamped in it. By the fixing of the spindle nut 4, a coarse travel according to the principle of a ram is attained by the spindle 1 itself.

Figure 1:
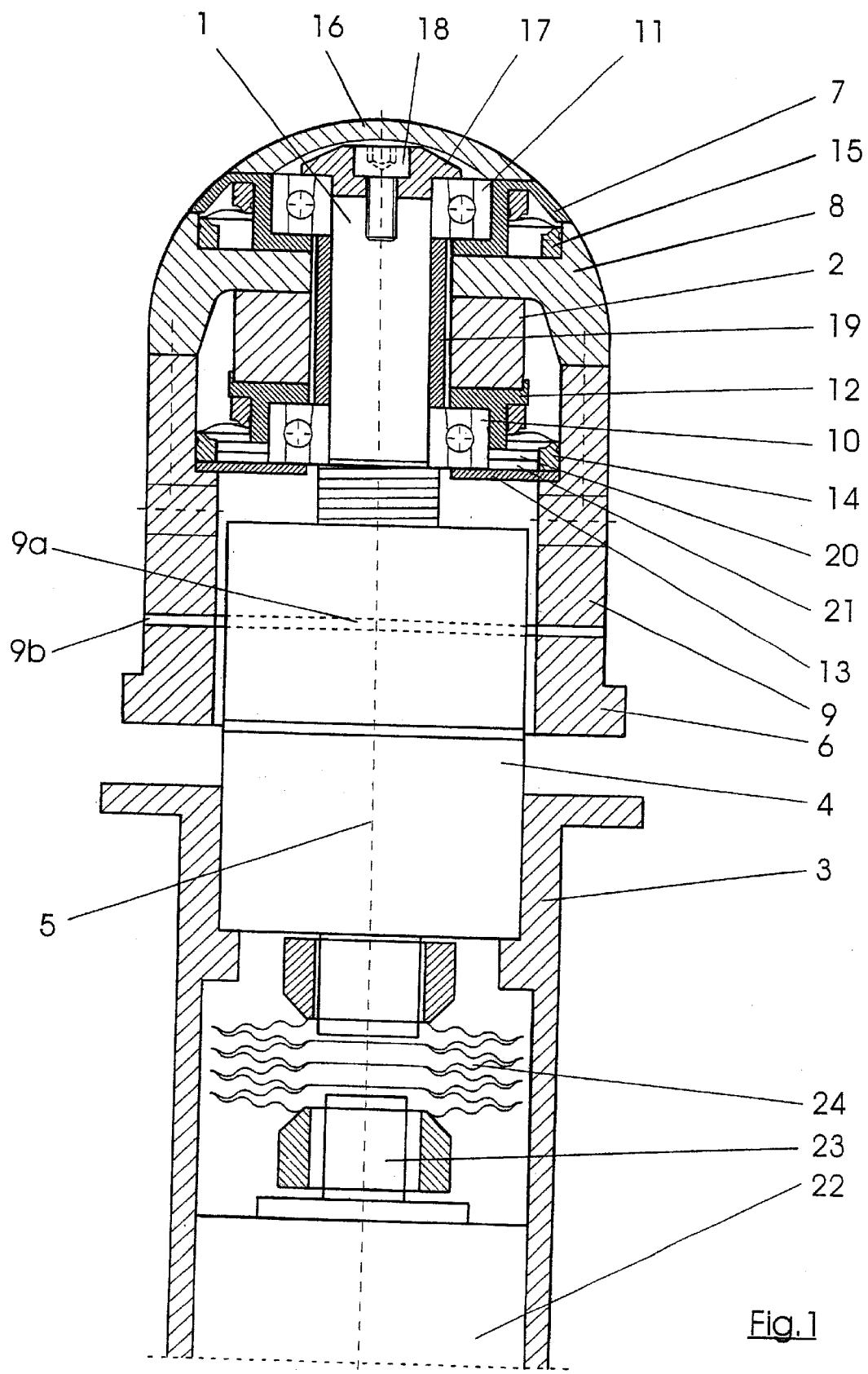
FIG. 1 shows a longitudinal section through the positioning device according to the invention, guided by transverse bores which form a cardan joint.
Figure 2:
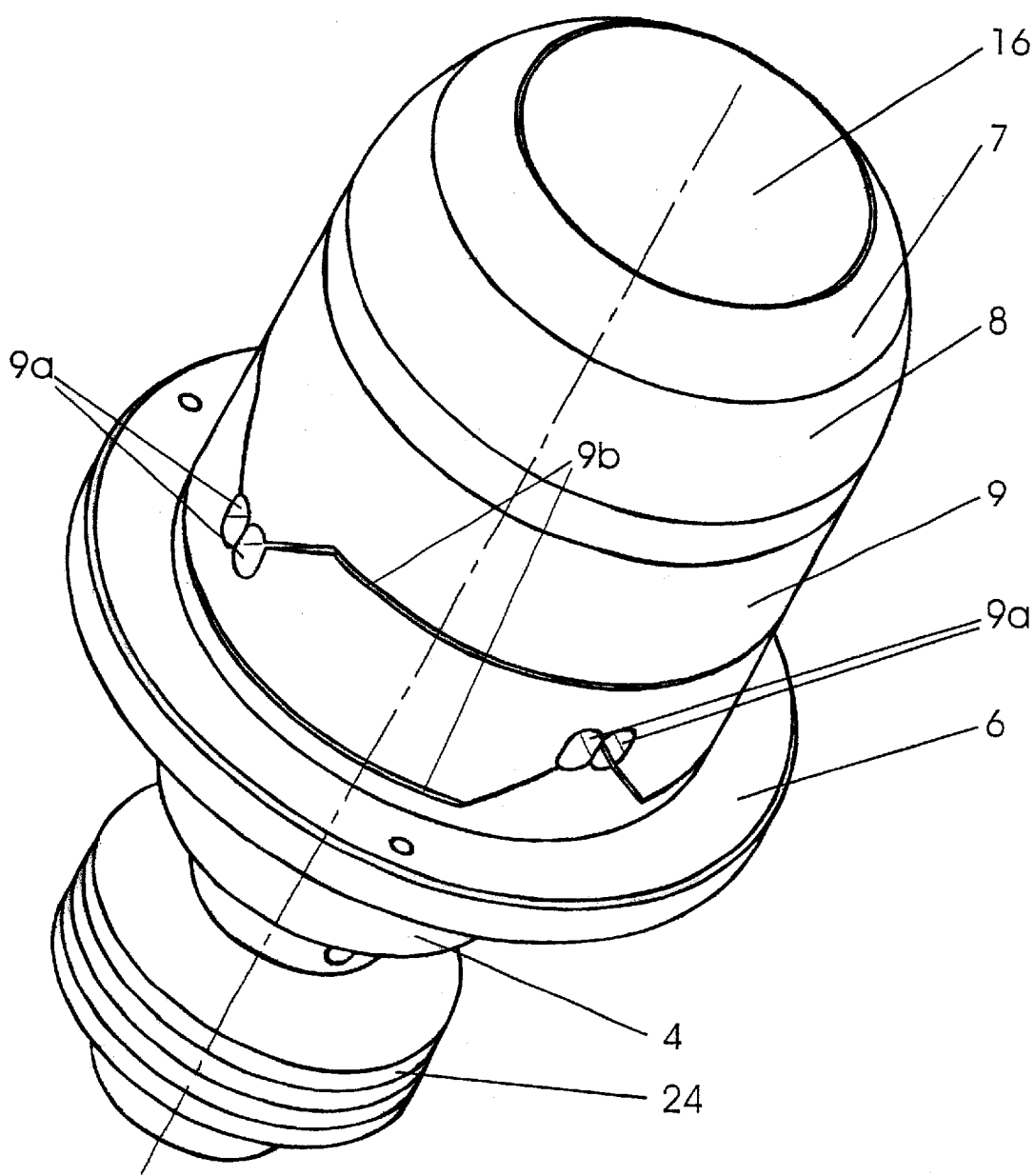
FIG. 2 shows an enlarged three-dimensional view of the positioning device according to FIG. 1.

A fine travel is axially superposed on the movement of the spindle 1 by means of the piezo-element 2. For this purpose, the piezo-element 2 is brought into the load transmission chain, thereby insuring that an introduction of a load takes place in the axial direction toward the piezo-axis or the longitudinal axis 5 of the spindle. An annular seating 6 is provided on a cardan joint 8, 9. By means of the annular seating 6 a bearing load, introduced by means of a seating or clamping crown 7 to the cardan joint (with an upper cardan part 8 and a lower cardan part 9 connected to it), is transmitted via the piezo-element 2 and a supporting crown 12 to a lower radial bearing 10 and thereby to the spindle 1 and the seating bushing 3. The cardan joint proper includes the lower cardan portion 9, for which purpose two respective through cross bores 9a are arranged situated close to each other, having only a thin respective web between them. Two sets of bores 9a with respectively a thin web between them, situated mutually offset by 90° and located in the same plane, can be seen in the enlarged illustration of FIG. 2. The position of the section according to FIG. 1 runs exactly between the bores 9a in the thin web.

A kind of cross-joint is formed by the bores 9a, which are adjoined by peripheral slots 9b, whereby a movement of the lower cardan portion 9 is provided in the space between the region situated above the bores 9a and that situated under the bores. The intersection point of the bore axes, which are mutually offset by 90°, then forms the pivot point. Fundamentally the upper cardan portion 8 could be integral with the region of the lower cardan portion 9 situated over the bores 9a. However, for mounting reasons it is in two parts and is connected to the lower cardan part 9 by means of a screw connection.

The cardan part 9 with the annular seating 6 at its lower end serves as a receiver for an object (not shown in the drawing) that is correspondingly provided with an annular seating portion.

The spindle 1 is also mounted in an upper radial bearing 11, the outer ring of which is supported on the clamping crown 7. The outer ring of the lower radial bearing is supported on the supporting crown 12, by means of which transfer of a support load to the lower radial bearing 10 takes place. A support plate 13 is arranged between the lower radial bearing 10 and the lower cardan part 9. However, an amount of play is present between the radial bearing 10 and the support plate 13 such that fine adjustments by means of lengthening of the piezo-element 2 can be effected. The two radial bearings 10 and 11 serve for rotationally uncoupling the spindle 1 and for its mounting during fine adjustment processes. A coaxial monolithic joint 14 with a spring device is tensioned between the lower cardan part 9 and the supporting crown 12, and in this manner forms, together with the supporting crown 12 and the upper cardan part 8 that is arranged axially above the piezo-element 2, a prestressing of the piezo-element in the axial direction.

A further coaxial monolithic joint 15 is clamped between the upper cardan part 8 and the clamping crown 7, and forms a prestress for the two radial bearings 10 and 11.

A cover 16 over the clamping crown 7 protects against impurities for the rotating components.

A cap 17 which is set on the spindle 1 and which is connected with a set screw 18 to the end of the spindle 1 provides a clamping element, via an annular shoulder at its periphery, for the upper radial bearing 11. A spacer sleeve 19 fixes the two inner rings of the radial bearings 10 and 11.

A movement relative to the spindle 1 of an object to be positioned or measured which is placed on the annular shoulder (object seating) 6 is measured with a capacitive sensor, e.g. with sensor parts 20 (target) and 21 (specimen), which indicate the movement of the piezo-element 2. For this purpose, the stationary element 20 of the sensor is fitted to the lower side of the supporting crown 12, which is connected fast to the piezo-element 2. The movable sensor element 21 is located on the support plate 13, which is connected fast to the lower cardan part 9. The fine adjustment is thus measured between the sensor parts 20 and 21 by changes of distance and hence changes of capacitance. The measurement of the fine movement is thus not effected directly at the piezo-element 2, but between the object seat 6 and the spindle 1. This means that the behavior of the interposed components is included in the measurement and the true movement of the object to be positioned is detected in contrast to its coarse travel.

An electric motor 22 arranged in the seating bushing 3 provides the drive for the spindle 1. Since the spindle 1 executes, besides its rotation, a linear movement for the travel, and a drive shaft 23 of the electric motor 22 is however stationary, a coupling 24 is provided between the drive shaft 23 and the spindle 1, so that this path can be equalized. The coupling 24 can be embodied in various ways. In a simple manner, it can be embodied as a metallic bellows, so that in spite of the necessary rotary rigidity, an axial relative movement of the stroke compensation is possible.

The piezoelectric linear positioning element with the piezo-element 2 thus accomplishes an adjustment in series with the spindle 1. On activating the piezo-element 2, it extends upward according to the illustrated embodiment, and thereby lifts up the cardan joint with the two cardan joint parts 8 and 9 and the object placed on the annular shoulder 6. On the underside, the piezo-element 2 is supported at the spindle via the supporting crown 12 and the lower radial bearing.

Small tiltings of the moved object are prevented from exerting bending moments on the positioning device because the annular shoulder 6 of the cardan joint 8, 9 is coupled to the object.

The two coaxial monolithic joints 14 and 15 prevent transverse forces being exerted on the piezo-element 2; rather, such forces are immediately diverted to the spindle 1. Thus the piezo-element 2 is loaded only axially.

Since the piezo-element 2 is prestressed by the coaxial monolithic joint 14, basically a contact to the joining surfaces is insured and besides pressure forces, tension forces can be introduced. A load is introduced on the object that is placed on the annular shoulder or object receiver 6. This load first goes via the cardan joint with the joint parts 8 and 9 into the piezo-element 2 and from there out to the supporting crown 12, the lower bearing 10 and then via the spindle 1 into the spindle nut 4 and hence into the seating bushing 3.

In the case of this force path, it must be insured, however, that a dynamic loading is also possible, i.e., it must be insured that in any case a contact is always present between the cardan part 8 and the piezo-element 2; otherwise, no fine adjustment would be possible. A prestress is provided for this purpose by the lower monolithic joint 14, and is pressed against the supporting crown 12 and against the cardan part 9. In addition, care has to be taken that the two radial bearings 10 and 11 are free from play. The upper monolithic joint 15 is provided for this purpose, whereby a prestress of the two radial bearings against the sleeve 19 is attained such that the two radial bearings 10 and 11 are pressed together with their outer rings. At the same time, it is thereby also insured that the upper part of the cardan joint can only move coaxially relative to the spindle axis.

A statically and dynamically stable base for the rotational movement between the spindle 1 and the fine adjustment unit by means of the piezo-element 2 arises because the inner ring of the upper bearing 11 is fixed by means of the cap 17 via the spacer sleeve 19 to the inner ring of the lower bearing 10.

This prestressing of the bearings is a necessary condition for freedom from play, and thereby results in bearing loading. It can be established by constructional means with respect to the coaxial monolithic joint 15. An exact and reproducible prestress is possible, while taking account of the actual change of load that is brought about by the object being moved, by means of the spring prestressing of the monolithic joint 15.

Fundamentally the positioning device, with the cardan joint and the fine travel or fine adjustment by the piezo-element 2, can be used for any spindle embodiment and independently of the coarse travel path of the spindle 1.

In contrast to the standing arrangement of the positioning device according to the embodiment, a suspended arrangement is of course also possible.

We claim:

1. A positioning device comprising:
   a rotary drive,
   a spindle,
   a spindle nut cooperating for conversion of a rotary motion into a linear motion for a coarse adjustment,
   a piezoelectric linear positioning element for fine adjustment arranged in series with said spindle and said spindle nut,
   an object receiver part arranged in series with said piezoelectric linear positioning element.
   an articulated joint, arranged between said object receiver part and said spindle, which relieves said piezoelectric linear positioning element of transverse forces and of moments, and a base, wherein said spindle nut is held non-rotatably in said base.

2. The positioning device according to claim 1, in which said joint comprises a cardan joint.

3. The positioning device according to claim 2, further comprising at least one sensor that measures movement of said piezoelectric linear positioning element.

4. The positioning device according to claim 2, further comprising an upper and a lower radial bearing, in which said spindle, for rotational uncoupling and for mounting during fine travel, is mounted in said upper and lower radial bearings, and an inner ring of said upper bearing is fixed via a spacer against an inner ring of said lower bearing.

5. The positioning device according to claim 1, in which said spindle nut is held non-rotatably in said base, and said spindle together with said piezoelectric linear positioning element is linearly displaceable.

6. The positioning device according to claim 5, in which said piezoelectric linear positioning element surrounds said spindle annularly.

7. The positioning device according to claim 5, further comprising a drive and a coupling between said drive and said spindle for linear length equalization.

8. The positioning device according to claim 3, in which said joint comprises a cardan joint.

9. The positioning device according to claim 3, further comprising at least one monolithic joint that prestresses said piezoelectric linear positioning element.

10. The positioning device according to claim 3, further comprising at least one sensor that measures movement of said piezoelectric linear positioning element.

11. The positioning device according to claim 3, further comprising an upper and a lower radial bearing, in which said spindle, for rotational uncoupling and for mounting during fine travel, is mounted in said upper and lower radial bearings and an inner ring of said upper bearing is fixed via a spacer against an inner ring of said lower bearing.

12. The positioning device according to claim 1, further comprising at least one monolithic joint that prestresses said piezoelectric linear positioning element.

13. The positioning device according to claim 12, further comprising a support supporting and piezoelectric linear positioning element, in which said joint comprises a cardan joint, such that a prestress runs via said cardan joint and said support to active surfaces of said piezoelectric linear positioning element.

14. The positioning device according to claim 5, in which said joint comprises a cardan joint.

15. The positioning device according to claim 1, further comprising at least one sensor that measures movement of said piezoelectric linear positioning element.

16. The positioning device according to claim 15, in which said sensor comprises a capacitive sensor.

17. The positioning device according to claim 15, further comprising a support supporting said piezoelectric linear positioning element and a carrier plate connected fast to a lower joint part of said cardan joint, in which a stationary element of said sensor is arranged on an underside of said support and a moving element of said sensor is arranged on said carrier plate.

18. The positioning device according to claim 1, further comprising an upper and a lower radial bearing, in which said spindle, for rotational uncoupling and for mounting during fine travel, is mounted in said upper and lower radial bearings, and an inner ring of said upper bearing is fixed via a spacer against an inner ring of said lower bearing.

19. The positioning device according to claim 18, further comprising at least one monolithic joint that prestresses an outer ring of at least one of said upper and lower radial bearings.

20. A positioning device comprising:

a rotary drive, a spindle, a spindle nut cooperating for conversion of a rotary motion into a linear motion for a coarse adjustment, a piezoelectric linear positioning element for fine adjustment arranged in series with said spindle and said spindle nut, an object receiver part arranged in series with said piezoelectric linear positioning element, an articulated joint arranged between said object receiver part and said spindle, which relieves said piezoelectric linear positioning element of transverse forces and of moments, and, a base, wherein said spindle nut is held non-rotatably in said base and said spindle together with said piezoelectric linear positioning element is linearly displaceable, further comprising a drive and a coupling between said drive and said spindle for linear length equalization, wherein said coupling comprises a rotationally rigid bellows.

* * * * *